United States Patent
Hanazaki et al.

(10) Patent No.: US 7,048,303 B2
(45) Date of Patent: May 23, 2006

(54) AIR BAG STARTER AND BACKUP CIRCUIT USED THEREIN

(75) Inventors: Yasumasa Hanazaki, Tokyo (JP); Takashi Furui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/379,672

(22) Filed: Mar. 6, 2003

(65) Prior Publication Data
US 2003/0168840 A1    Sep. 11, 2003

(30) Foreign Application Priority Data
Mar. 8, 2002  (JP) ............................ P2002-063994

(51) Int. Cl.
B60R 21/32  (2006.01)
B60R 21/01  (2006.01)

(52) U.S. Cl. .................... 280/735; 307/10.1; 701/45

(58) Field of Classification Search ................ 280/735; 180/274, 282; 340/436, 438; 307/10.1; 701/45

See application file for complete search history.

(56) References Cited

U.S. PATENT DOCUMENTS

| | | | |
|---|---|---|---|
| 5,460,404 A * | 10/1995 | Damisch et al. ............ 280/735 |
| 5,657,831 A * | 8/1997 | Furui ......................... 280/735 |
| 5,801,348 A | 9/1998 | Asada |
| 6,628,007 B1 * | 9/2003 | Baumgartner ............... 180/282 |
| 6,698,791 B1 * | 3/2004 | Furui ......................... 280/735 |

FOREIGN PATENT DOCUMENTS

JP    9-211023    8/1997

* cited by examiner

*Primary Examiner*—Ruth Ilan
(74) *Attorney, Agent, or Firm*—Sughrue Mion, PLLC

(57) ABSTRACT

A mechanical acceleration switch acting in response to a collision involving a vehicle tends to occur with chattering, thereby lowering the reliability of operation due to insufficient application of an ignition current to an igniter of an air bag in the vehicle. When the mechanical acceleration switch is closed and first-stage igniters are ignited, a forced igniter is turned on. Even if chattering occurs in the mechanical acceleration switch, the first-stage igniters and a backup capacitor are conductively connected by turning on a driving transistor, such that an electric current is sufficiently delivered to the igniters. As a result, it is possible to improve the reliability of the operation of starting the air bag. Furthermore, it is no longer necessary to increase a capacity of the capacitor and change the constitution of the mechanical acceleration switch to decrease chattering therewith.

12 Claims, 7 Drawing Sheets

AIR BAG STARTER AND BACKUP CIRCUIT USED THEREIN

BACKGROUND OF THE INVENTION

1. Field of the Invention

The present invention relates to an air bag starter that is installed in a vehicle and protects a driver and a passenger inside the vehicle from a shock at the time an accident, such as collision, occurs and to a backup circuit that is used in the air bag starter to accurately back up an inflating operation of the air bag.

2. Description of Related Art

A so-called air bag system that is installed in a vehicle (e.g., a car) and inflated by, for example, igniting a powder loaded in the system or breaking a plug (stopper) of a high-pressure cylinder upon occurrence of a collision or the like, in order to protect a driver and a passenger inside the vehicle from a shock, has been put into practical use. A system for ignition of the air bag including an electric circuit is hereinafter referred to as an air bag starter or simply a starter.

FIG. 5 shows an example of a construction of a conventional starter, for example, a starter disclosed in the International Application No. PCT/JPOO/07051. Referring to FIG. 5, reference numeral 1 is a battery installed in a vehicle, and numeral 2 is an ignition switch for starting an engine of the vehicle. Numeral 3 is a driver's seat air bag disposed in the driver's seat, and numeral 4 is an igniter for a first-stage inflator (detonating powder or the like not shown in the drawing) for inflating the driver's seat air bag 3. Numeral 5 is an igniter for a second-stage inflator that is ignited, when required, synchronously with the first-stage inflator or with a predetermined delay after the ignition of the first-stage inflator.

Numeral 6 is an assistant driver's seat air bag disposed in the assistant driver's seat, and numeral 7 is an igniter for a first-stage inflator for inflating the assistant driver's seat air bag 6. Numeral 8 is an igniter for a second-stage inflator (detonating powder or the like not shown) that is ignited, when required, synchronously with the first-stage inflator or with a predetermined delay after the ignition of the first-stage inflator.

Numeral 9 is an air bag control unit including an electric circuit for transmitting an electric signal to each of the foregoing igniters and igniting them. Numeral 10 is a DC-to-DC converter boosting input voltage supplied from the battery 1 installed in the vehicle and outputting the voltage, and numeral 11 is a backup condenser (feeding means) charged with a power outputted by the DC-to-DC converter 10. Numeral 12 is a mechanical acceleration switch arranged to close when a decelerating acceleration of the vehicle exceeds a predetermined level. The mechanical acceleration switch 12 is arranged so that an electric current is not sent to the inflators owing to any malfunction of any driving transistor and prevents the inflators from ignition caused by the malfunction. Such a mechanical acceleration switch 12 is disclosed in, for example, the Japanese Patent Publication (unexamined) No. 211023/1997. The mechanical acceleration switch disclosed in this Japanese Patent Publication (unexamined) No. 211023/1997 has a construction in which the switch is closed upon occurring a weight shift owing to so-called a colliding acceleration at the time of a collision, and the switch is opened upon returning the weight to a predetermined position by spring force when the acceleration disappears. Numeral 13 is an acceleration sensor that measures an acceleration of the vehicle and outputs a signal conforming to the acceleration. Numeral 14 is ignition-judging means that makes a judgment on ignition of the first-stage inflator and the second-stage inflator of the driver's seat air bag 3 as well as the first-stage inflator and the second-stage inflator of the assistant driver's seat air bag 6 on the basis of the acceleration signal inputted from the acceleration sensor 13. This ignition judging means 14 turns on related driving transistors (described later) and at the same time outputs a signal X (shown in FIG. 5) synchronizing with "on" of the driving transistor.

Numeral 15 is a second-stage forced igniting means (forced igniting means) that is disposed in parallel to the mechanical acceleration switch 12, connects the backup condenser 11 with a common connecting portion where the first-stage igniters 4 and 7 and the second-stage igniters 5 and 8 are connected, and supplies an ignition current to the second-stage igniters 5 and 8 at the time of forcedly igniting the second-stage inflators in response to the signal from the ignition judging means 14. Numeral 31 is a driving transistor (switching means for forced ignition or a switch) disposed in parallel to the mechanical acceleration switch 12 between the backup condenser 11 and the common connecting portion where the first-stage igniters 4 and 7 and the second-stage igniters 5 and 8 are connected in parallel.

Numeral 32 is closure detecting means that detects the mechanical acceleration switch 12 being closed and holds a closure signal (hereinafter referred to as signal A for convenience of explanation) output for a predetermined time after the mechanical acceleration switch 12 is once closed and then opened. Numeral 33 is a two-input AND gate (logic means) in which the two input terminals are connected to the ignition judging means 14 and to (the signal A of) the closure detecting means 32 respectively, and an output terminal is connected to a gate (control terminal) of the driving transistor 31.

The driving transistor 31, the closure detecting means 32, and the AND gate 33 constitute the second-stage forced igniting means 15. Numerals 16 and 17 are driving transistors (first switching means) that control the turning on and off of an electric current for igniting the first-stage inflator of the driver's seat air bag 3. Numerals 18 and 19 are driving transistors (second switching means) for the second-stage inflator of the driver's seat air bag 3. Numerals 20, and 21 are driving transistors (first switching means) for the first-stage inflator of the assistant driver's seat air bag 6. Numerals 22 and 23 are driving transistors (second switching means) for the second-stage inflator of the assistant driver's seat air bag 6. The ignition judging means 14 is connected to gates (control terminals) of the driving transistors 16, 17, 18, 19, 20, 21, 22 and 23, and controls "on" and "off" of the driving transistors 16, 17, 18, 19, 20, 21, 22 and 23 in response to the acceleration signal inputted from the acceleration sensor 13.

Now, described below are operations of the conventional air bag system shown in FIG. 5. FIGS. 6 and 7 are timing charts showing various aspects of an igniting operation in the air bag system shown in FIG. 5.

When a key (not shown) is turned to a position for starting the engine and the ignition switch 2 is closed, the DC-to-DC converter boosts a direct-current power outputted from the vehicle-mounted battery 1, and the backup condenser 11 is charged with the power.

In the case of a collision, when a decelerating acceleration caused by the collision exceeds a predetermined acceleration, the mechanical acceleration switch 12 is closed. In this process, the closure detecting means 32 detects the mechanical acceleration switch 12 being closed, converts the output signal (the signal A) delivered to the AND gate 33 from an L (i.e., low) level to an H (i.e., high) level, and holds the signal level.

On the basis of the acceleration signal inputted from the acceleration sensor 13, the ignition judging means 14 chooses a proper inflation form from among four forms of the driver's seat air bag 3 and the assistant driver's seat air bag 6 described below.

Inflation form A: the air bags 3 and 6 are not inflated.

Inflation form B: only the first-stage inflators are ignited, and the air bags 3 and 6 are inflated to a proper degree.

Inflation form C: The first-stage inflators are ignited and then the second-stage inflators are ignited after a predetermined delay, such that the air bags 3 and 6 are inflated strongly to a certain degree.

Inflation form D: The first-stage inflators and the second-stage inflators are ignited at the same time, such that the air bags 3 and 6 are inflated strongly.

If either the inflation form B or C is chosen, the ignition judging means 14 turns on the driving transistors 16, 17, 20 and 21 in order to ignite the first-stage inflators of the driver's seat air bag 3 and the assistant driver's seat air bag 6. As a result, an electric current necessary for the ignition is conducted to the first-stage igniters 4 and 7 to ignite the first-stage inflators, such that the driver's seat air bag 3 and the assistant driver's seat air bag 6 are inflated to the proper degree. In this case, as shown in FIG. 6, the mechanical acceleration switch 12 is supposed to be closed at the time when the driving transistors for igniting the first-stage inflators are turned on, and it is therefore possible to ignite the first-stage inflators.

Next, if choosing the inflation form B, since for reasons of safety it is preferable that the second-stage inflators not be left without igniting them, the second-stage inflators are forcedly ignited immediately after the collision. In this case, a time lag from the ignition of the first-stage inflators to the ignition of the second-stage inflators is, for example, T or T'=100 milliseconds. As shown in FIG. 6, whether the mechanical acceleration switch 12 is opened or closed is not always clear at the time when the second-stage inflators are ignited. To cope with this, when the driving transistors 18, 19, 22 and 23 are turned on, the output signal X, which is input to the AND gate 33, is converted from an L level to an H level at the same time. The two signals having the H level (i.e., the signal A and the signal X) are inputted to the two input terminals of the AND gate 33 respectively and, thus, a signal having the H level is outputted from the AND gate 33 such that the driving transistor 31 is turned on. As a result, the common connecting portion where the first-stage igniters 4 and 7 and the second-stage ignites 5 and 8 are connected in parallel and the backup condenser 11 are electrically connected, and therefore the backup condenser 11 supplies a current to the second-stage igniters 5 and 8 such that the second-stage inflators are ignited.

According to the foregoing construction, when the signal X that commands the second-stage inflators to ignite is outputted by the ignition judging means 14, the signal A indicating that the mechanical acceleration switch 12 is closed is also outputted by the closure detecting means 32. As a result, the driving transistor 31 is turned on and the second-stage igniters 5 and 8 are ignited.

However, a collision involving a vehicle includes extremely indefinite factors, and therefore an operation waveform of the mechanical acceleration switch 12 is not always stable, contrary to the waveform illustrated in FIG. 6. FIG. 7 is a timing explanation diagram for explaining a timing and shows a waveform that is more likely to actually occur. At the moment of collision, the mechanical acceleration switch 12 presents a so-called chattering phenomenon such as an irregular vibration. As a result, a first-stage ignition current delivered from the condenser 11 to the air bag 3 or 6 has a waveform that oscillates as indicated by numeral 99 in FIG. 7, and, for example, an average value of the electric current is lowered and the air bag ignition becomes uncertain, eventually resulting in a reduced reliability of operation.

To overcome the aforementioned disadvantage in the conventional air bag starter, in addition to adopting any arrangement that reduces the chattering in the mechanical acceleration switch 12, it is necessary to improve the reliability of the ignition operation by making the time for turning on the first-stage ignition driving transistors 16, 17, 20 and 21 longer than a minimum time necessary for the ignition of the inflators and enlarging a capacity of the condenser 11 so that the current is applied there from for a longer time. Alternatively, it is necessary to prevent the negative influence of chattering by boosting a voltage for charging the condenser 11 and shortening a rise time of the current.

The foregoing explanation describes a two-stage ignition type air bag system, and it is a matter of course that the same problems may occur in a one-stage ignition type air bag system. The one-stage ignition type air bag system is not provided with the forced igniting means 15 in FIG. 5, and the air bags 3 and 6 are not provided with any portion related to the second-stage inflators. However, the operation for ignition of the first-stage igniters 4 and 7 is the same, and this system likewise has the foregoing problems caused by chattering of the mechanical acceleration switch 12 in the same manner as in the case of the two-stage ignition type air bag system.

As described above, in the conventional air bag starter, if any chattering takes place in the mechanical acceleration switch 12 at the time of turning on the driving transistor and delivering the ignition current, the ignition current is not sufficiently delivered to the driver's seat air bag 3 and/or the assistant driver's seat air bag 6 and, in some cases, the inflators do not ignite. As a result, a problem exists in that the reliability of operation is lowered.

SUMMARY OF THE INVENTION

The present invention has been made to solve the above-discussed problems and has an object of providing an air bag starter in which an ignition current is not lowered even if chattering occurs in a mechanical acceleration switch of the air bag starter, thereby ensuring the reliability in the igniting operation.

An air bag starter according to the invention includes a mechanical acceleration switch, closure detecting unit, ignition judging unit, logic unit, and a switch. The mechanical acceleration switch is connected to an igniter of an air bag and closes in response to acceleration of a vehicle. The closure detecting unit detects the mechanical acceleration switch being closed and outputs a first signal. The ignition judging unit detects an acceleration of the vehicle, judges the acceleration level, decides a method of igniting the aforementioned igniter, and outputs a second signal B. The logic unit outputs a forced ignition signal to forcedly ignite the igniter based on the logical AND value of the first signal and the second signal. The switch is connected in parallel to the mechanical acceleration switch and controlled by the forced ignition signal.

In an air bag starter having the above construction, upon starting the mechanical acceleration switch, the forced igniting unit connected in parallel to the mechanical acceleration switch is closed. As a result, even if chattering occurs in the mechanical acceleration switch, electric current is sufficiently delivered to the igniter to be ignited first, and the air bags are inflated without fail. This improves the reliability of the ignition operation. Furthermore, it is no longer necessary to enlarge a capacity of the capacitor and take additional measures to improve an accuracy in the operation of the mechanical acceleration switch.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
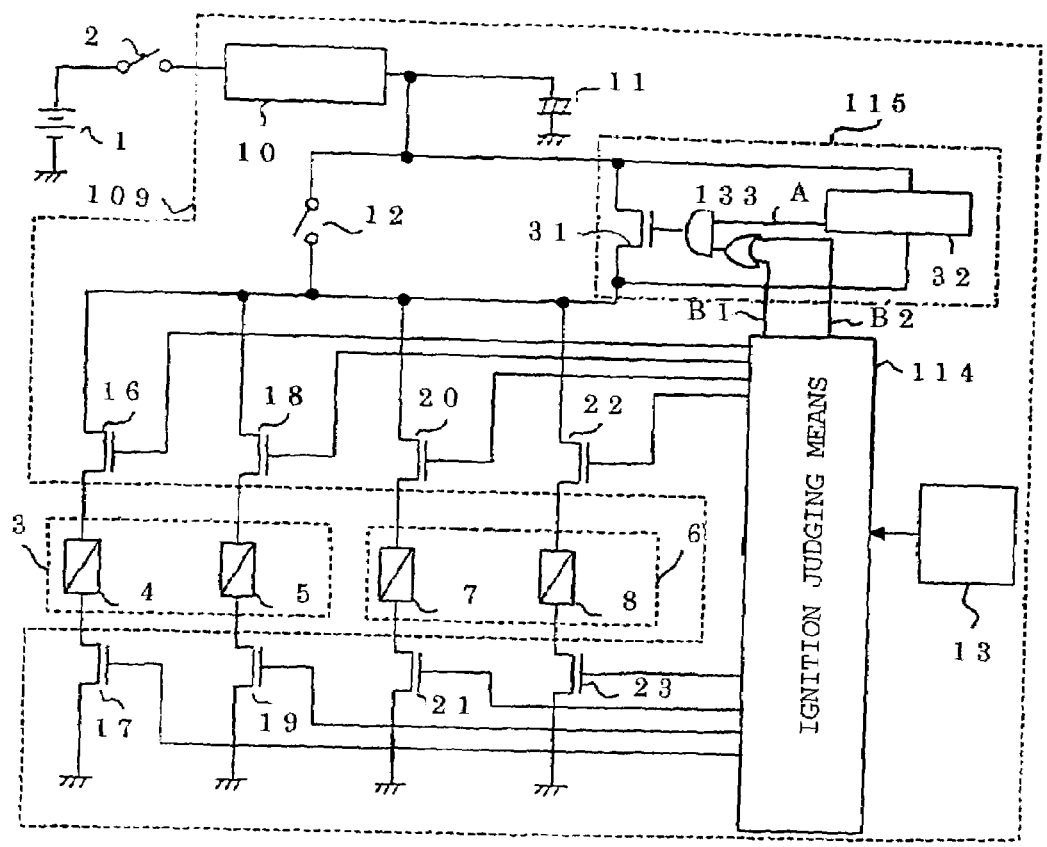
FIG. 1 is a circuit block diagram of an air bag starter according to Embodiment 1 of the present invention.

FIG. 1 is a circuit diagram of an air bag starter according to Embodiment 1, in which a two-stage ignition type air bag system is taken as an example. In the drawings, the same numerals indicate same parts as those in the drawings used to explain the conventional air bag starter, and a detailed explanation of them is, thus, not repeated.

Now referring to the drawings, reference numeral 1 is a battery installed in a vehicle, and numeral 2 is an ignition switch for starting an engine of the vehicle. Numeral 3 is a driver's seat air bag disposed in the driver's seat, and numeral 4 is an igniter (e.g., detonating primer) for a first-stage inflator (e.g., detonating powder or the like, though not shown in the drawing) used to inflate the driver's seat air bag 3. Numeral 5 is an igniter for a second-stage inflator that is ignited, when required, synchronously with the first-stage inflator or after a predetermined delay following the ignition of the first-stage inflator.

Numeral 6 is an assistant driver's seat air bag disposed in the assistant driver's seat, and numeral 7 is an igniter for a first-stage inflator used to inflate the assistant driver's seat air bag 6. Numeral 8 is an igniter for a second-stage inflator (e.g., detonating powder or the like, not shown) that is ignited, when required, synchronously with the first-stage inflator or with a predetermined delay after the ignition of the first-stage inflator.

Numeral 109 is an air bag control unit including an electric circuit for transmitting an electric signal to each of the foregoing igniters to ignite them. Numeral 10 is a DC-to-DC converter for boosting an input voltage supplied from the battery 1 installed in the vehicle and outputting the boosted voltage, and numeral 11 is a backup condenser (feeding means) charged with power outputted by the DC-to-DC converter. Numeral 12 is a mechanical acceleration switch arranged to close when a decelerating acceleration of the vehicle exceeds a predetermined level. Numeral 13 is an acceleration sensor that measures an acceleration of the vehicle and outputs a signal corresponding to the acceleration. Numeral 114 is ignition-judging means that makes a judgment on whether to ignite the first-stage inflator and the second-stage inflator of the driver's seat air bag 3 as well as the first-stage inflator and the second-stage inflator of the assistant driver's seat air bag 6 on the basis of the acceleration signal inputted from the acceleration sensor 13. This ignition judging means 14 turns on related driving transistors (described later) and, synchronously with this turning on, outputs a signal B1 for first-stage forced ignition and a signal B2 for second-stage forced ignition.

Numeral 115 is a forced igniting means, which is disposed in parallel to the mechanical acceleration switch 12, for forcedly igniting the second-stage inflators in response to the signals from the ignition judging means 114. This forced igniting means 115 assists, serving as a backup, first-stage ignition to ignite the first-stage inflators without fail as described later. Numeral 31 is a driving transistor (switching means for forced ignition) disposed in parallel to the mechanical acceleration switch 12. Numeral 32 is closure detecting means that detects the mechanical acceleration switch 12 being closed and outputs a closure signal (hereinafter referred to as signal A) for a predetermined time after the mechanical acceleration switch 12 is once closed and then opened.

Numeral 133 is a three-input-two AND gate in which three input terminals are connected respectively to a signal B1 terminal of the ignition judging means 114, a signal B2 terminal of the ignition judging means 114, and a signal A of the closure detecting means 32. The three-input-two AND gate is logic means that outputs an "on" signal on condition that, among the three inputs A, B1, and B2, the inputs A and B1 are both "on" or the inputs A and B2 are both "on". An output terminal of the three-input-two AND gate 133 is connected to a gate (control terminal) of the driving transistor 31. For convenience of explanation, numeral 133 is hereinafter referred to as a two/three AND gate.

The driving transistor 31, the closure detecting means 32, and the two/three AND gate 133 constitute the forced igniting means 115. Numerals 16 and 17 are driving transistors (switching means) for controlling an ignition circuit of the first-stage inflator of the driver's seat airbag 3. Numerals 18 and 19 are driving transistors (switching means) for the second-stage inflator of the driver's seat air bag 3. Numerals 20 and 21 are driving transistors (switching means) for the first-stage inflator of the assistant driver's seat air bag 6. Numerals 22 and 23 are driving transistors (switching means) for the second-stage inflator of the assistant driver's seat air bag 6. In addition, the ignition judging means 114 is connected to gates (control terminals) of the driving transistors 16, 17, 18, 19, 20, 21, 22 and 23. The ignition judging means 114 controls an on/off state of the driving transistors 16, 17, 20 and 21 or the driving transistors 18, 19, 22 and 23 in response to the acceleration signal inputted from the acceleration sensor 13. The ignition judging means 114 outputs the signal B1 synchronously with an "on" state of the driving transistors 16, 17, 20 and 21, and outputs the signal B2 synchronously with an "on" state of the driving transistors 18, 19, 22 and 23. In other words, the signal B2 is equivalent to the signal X in the foregoing description of the conventional air bag starter.

Figure 2:
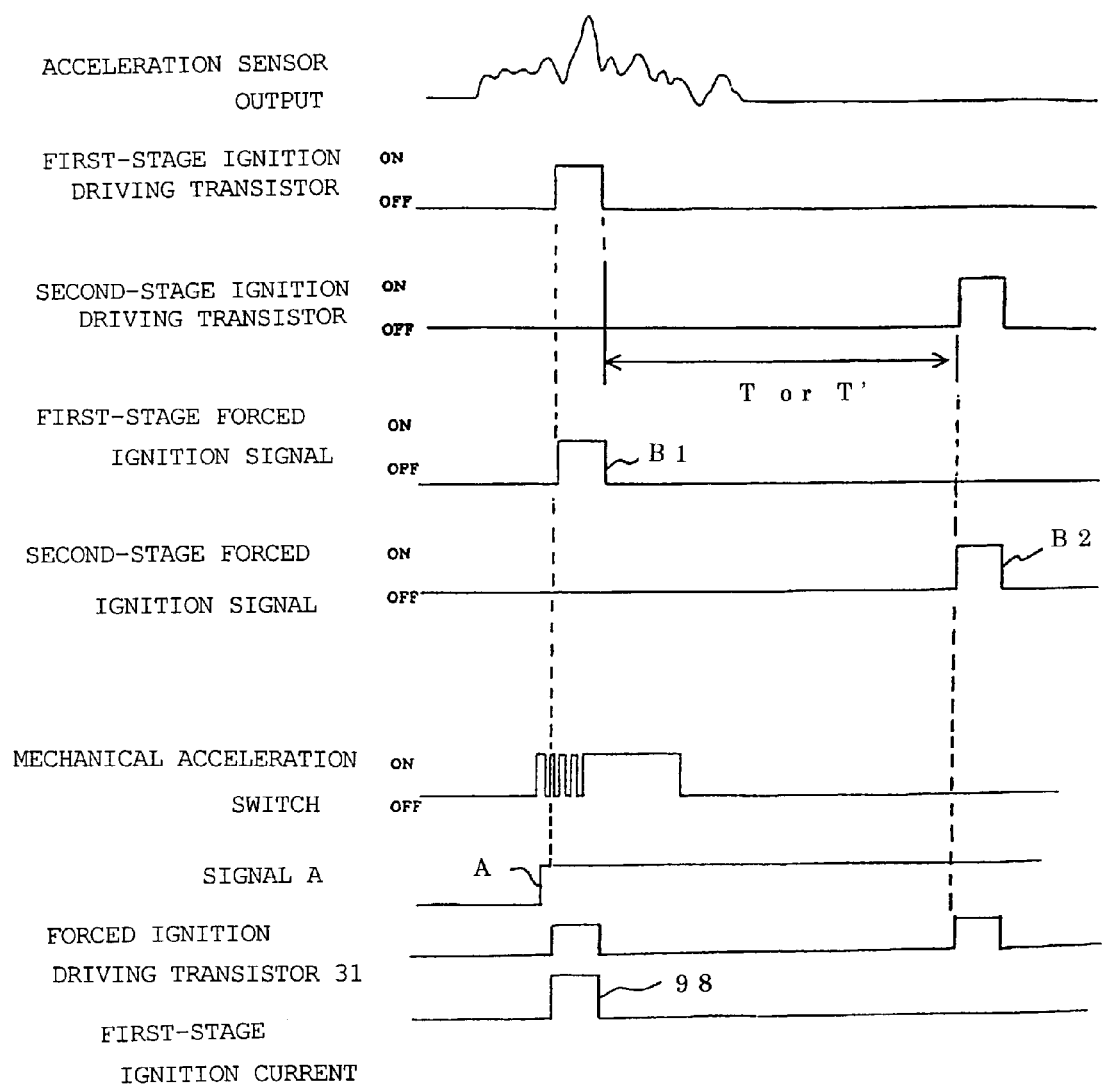
FIG. 2 is a timing chart to explain operation of the air bag starter in FIG. 1.

FIG. 2 is a timing chart to explain various situations in an igniting operation of the two-stage type air bag starter shown in FIG. 1.

Upon occurrence of a collision, during a period when acceleration caused by the collision exceeds a predetermined acceleration level, the mechanical acceleration switch 12 is closed and chattering is present. At this time, the closure detecting means 32 detects that the mechanical acceleration switch 12 is closed, converts the signal A for the two/three AND gate 133 from an L level to an H level, and holds the foregoing signal level.

The ignition judging means 114 judges the signal of the acceleration sensor 13 and decides the igniting method as described in the foregoing conventional example. The ignition judging means 114 turns on the driving transistors 16, 17, 20 and 21 in order to ignite the first-stage inflators of the driver's seat air bag 3 and 5 the assistant driver's seat air bag 6 according to the decided igniting method. At the same time, the output signal B1 for the two/three AND gate 133 is converted from an L level to an H level. The signal Bi is substantially synchronized with a closing operation of the mechanical acceleration switch 12, but is not always synchronized with the closing operation.

The two/three AND gate 133 outputs a signal of an H level and turns on the driving transistor 31 (shown as a first-stage forced ignition signal in the drawing) when signals of an H level are inputted to two of the three input terminals. Accordingly, the first-stage igniters 4 and 7 and the backup condenser 11 are conductively connected by turning on the driving transistor 31, such that an electric current 98 is delivered to the igniters 4 and 7. As a result, it is possible to prevent a reduction in the electric current caused by any chattering of the mechanical acceleration switch 12, and it is possible to ignite the air bags without failure (i.e., more reliably).

Figure 5:
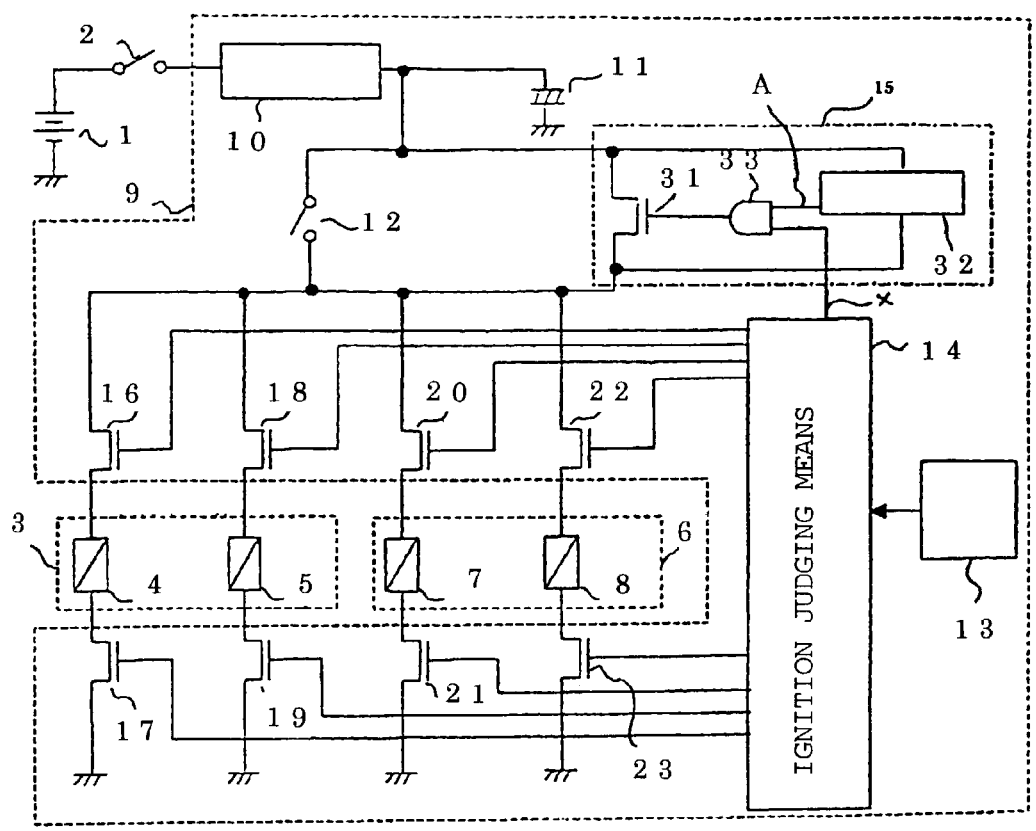
FIG. 5 is a circuit block diagram of a conventional air bag starter.
Figure 6:
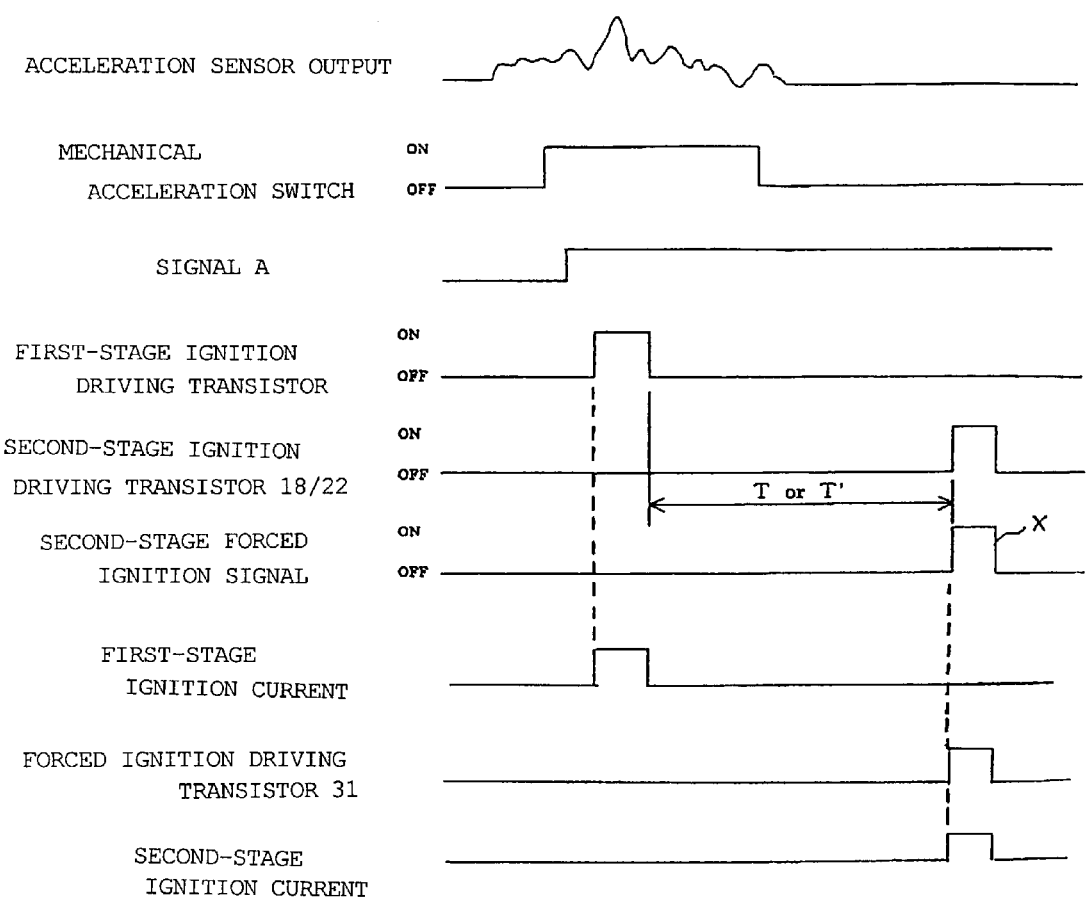
FIG. 6 is a timing chart to explain operation of the air bag 20 starter in FIG. 5.
Figure 7:
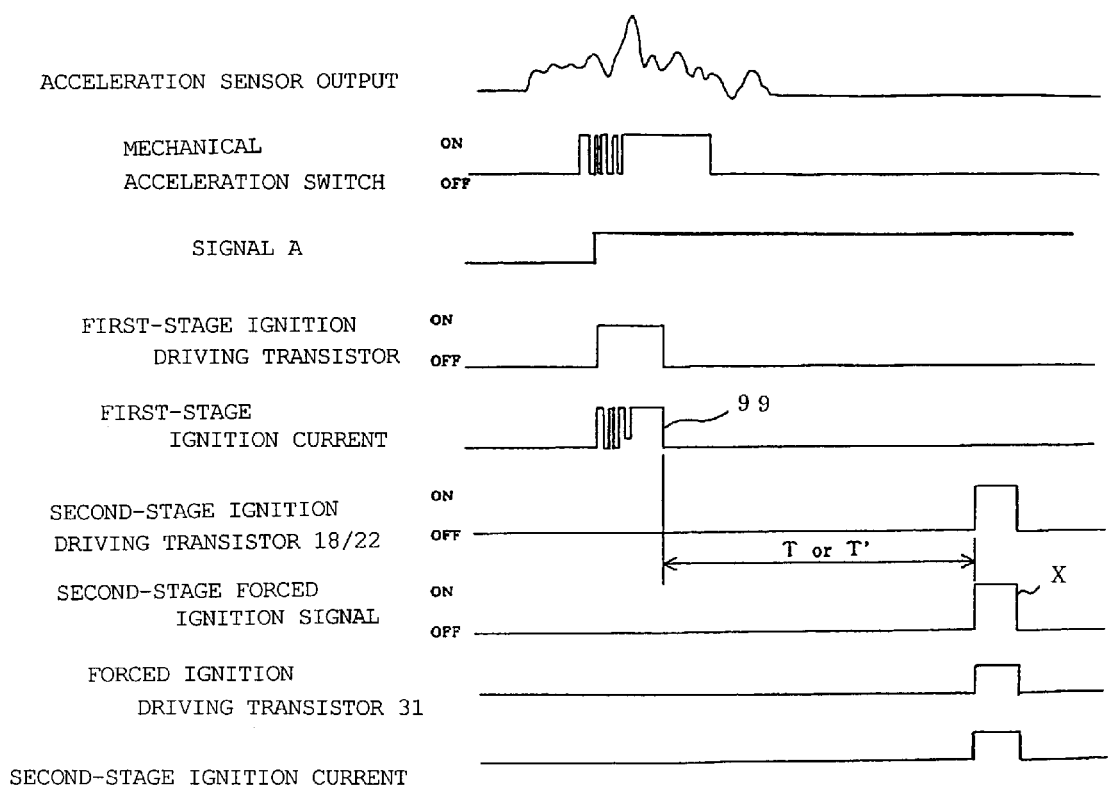
FIG. 7 is a timing chart to explain defects in operation of the air bag starter in FIG. 5.

The subsequent operations of igniting the second-stage igniters are the same as those described referring to FIGS. 5, 6 and 7 of the conventional air bag starter, and any further explanation thereof is, thus, unnecessary. When a predetermined time has passed since the first-stage igniting operation, the ignition judging means 114 turns on the second-stage driving transistors 18, 19, 22 and 23, and outputs the signal B2 at the same time. Then, the logic circuit 133 turns on the forced igniting means 31 on the basis of the logical AND value of the signal A and the signal B2.

Since chattering of the mechanical acceleration switch 12 does not influence the first-stage ignition current, it is not necessary to take measures to reduce such chattering in constitution of the mechanical acceleration switch 12.

Furthermore, it is not necessary to take measures such as boosting a voltage with which the condenser 11 is charged and expanding a capacity of the capacitor. As a result, it is possible to avoid an increase in cost and an enlargement in configuration.

Although two air bags are shown for the driver's seat and the assistant driver's seat, respectively, in FIG. 1, it is also possible to dispose only one air bag or more than two air bags without changing the fundamental operation as a matter of course.

Although the foregoing description relates to a two-stage ignition type air bag system, in an air bag system with more than two stages, the operations and advantages thereof essentially remain unchanged. That is, the ignition judging means outputs plural signals B (B1 . . . Bn) and the semiconductor switch 31 is turned on by a forced ignition signal outputted on the basis of a logical AND value of the signal A and any of signals B1 . . . Bn, thereby overcoming the problem of chattering in the mechanical acceleration switch 12 in the same manner as in the two-stage ignition type air bag system.

Embodiment 2

Now, a case of a one-stage ignition type air bag system is hereinafter described with reference to FIG. 3. The fundamental constitution is the same as that in FIG. 1 and, thus, any further detailed explanation is unnecessary. Air bags 3 and 6 are not provided with any second-stage igniter and, consequently, no driving transistors to be connected to such a second-stage igniter exist. The forced igniting means 115 is provided with an AND gate 33 that acts upon receipt of the signal A outputted by the closure detecting means 32 and the signal B outputted by the ignition judging means 114.

Figure 3:
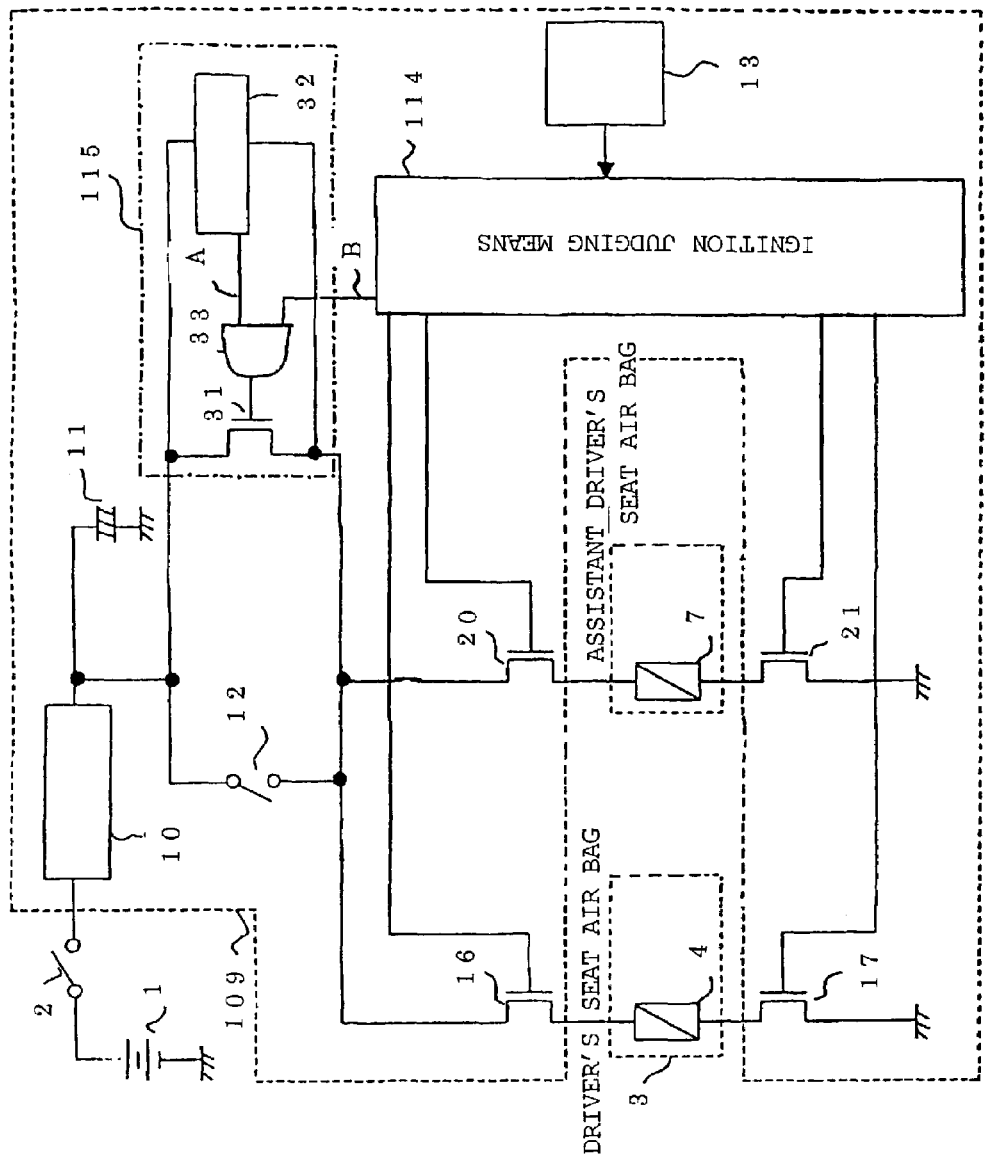
FIG. 3 is a circuit block diagram of an air bag starter according to Embodiment 2 of the invention.

Operation of the air bag starter in FIG. 3 is hereinafter described with reference to a timing chart of FIG. 4.

Upon occurrence of a collision involving the vehicle, during the period when acceleration caused by the collision exceeds a predetermined acceleration level, the mechanical acceleration switch 12 is closed and chattering may occur. At this time, the closure detecting means 32 detects the mechanical acceleration switch 12 being closed, converts the signal A for the AND gate 133 from an L level to an H level, and holds the foregoing signal level.

The ignition judging means 114 judges the signal of the acceleration sensor 13 and decides the igniting method. The ignition judging means 114 turns on the driving transistors 16, 17, 20 and 21 in order to ignite the inflators of the driver's seat air bag 3 and the assistant driver's seat air bag 6. The output signal B for the AND gate 33 is converted from L level to H level at the same time.

Figure 4:
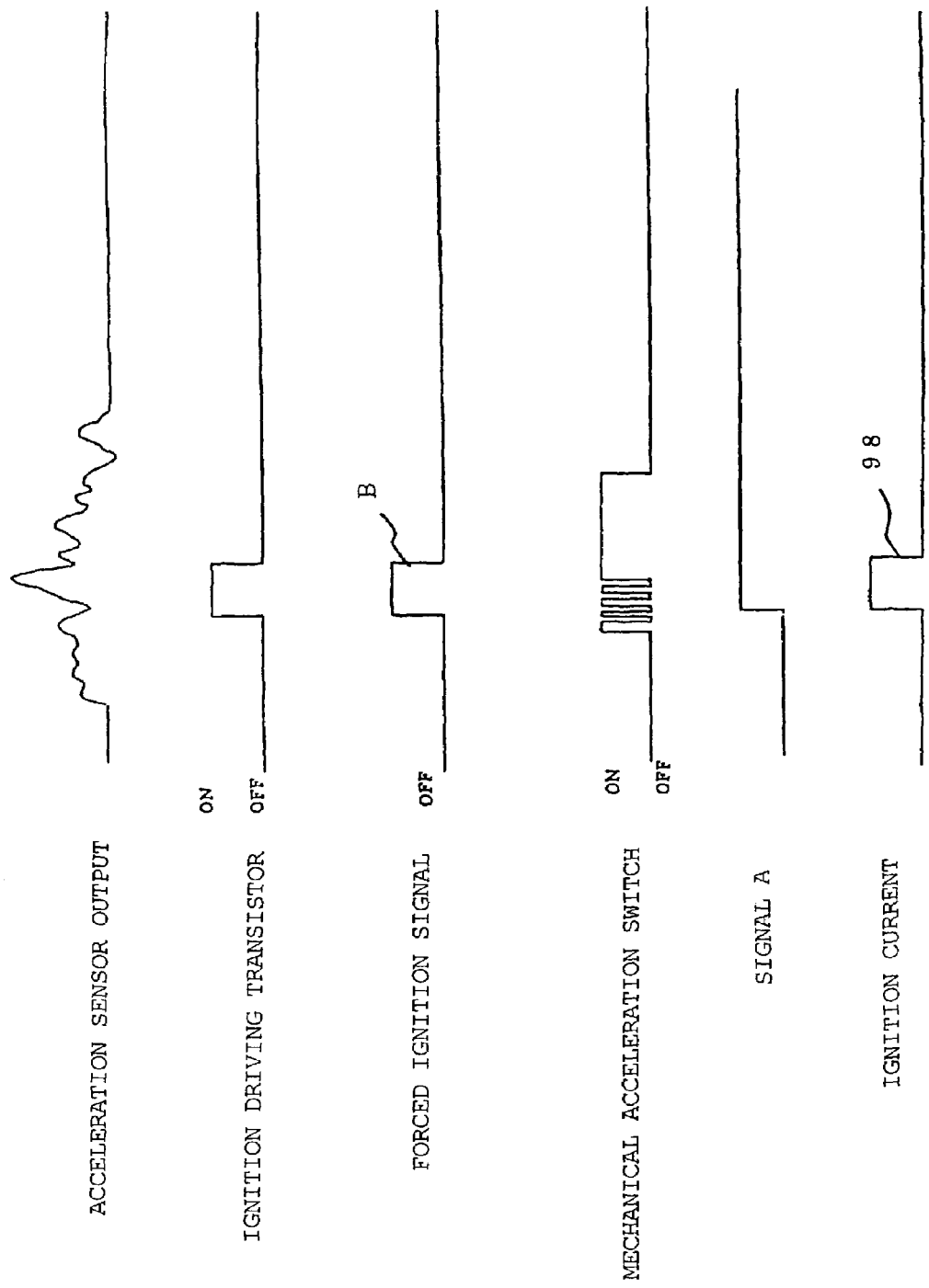
FIG. 4 is a timing chart to explain operation of the air bag starter in FIG. 3.

When signals having the H level are inputted to both of the two input terminals of the AND gate 33, the AND gate 33 outputs a signal of an H level and turns on the driving transistor 31 (shown in FIG. 4 as a forced ignition signal). The igniters 4 and 7 and the backup capacitor 11 are conductively connected by turning on the driving transistor 31 such that an electric current 98 is delivered to the igniters 4 and 7. As a result, it is possible to prevent a reduction in the electric current caused by the chattering of the mechanical acceleration switch 12, and it is possible to ignite the air bags without failure (i.e., more reliably).

Embodiment 3

In the foregoing Embodiments 1 and 2, an air bag starter to be connected to the air bags is specifically described in detail. However, it is to be noted that the most essential part of the invention is a backup circuit. This backup circuit is arranged to back up the mechanical acceleration switch 12 and avoid the negative influence of the chattering thereon by turning on the transistor 31 connected in parallel to a contact of the mechanical acceleration switch 12 when a detection signal of the acceleration sensor 13 disposed separately from the mechanical acceleration switch 12 exceeds a predetermined level.

Specifically, the backup circuit is constituted as a device including the forced igniting means 115, the ignition judging means 114, and the acceleration sensor 13 in FIG. 1, for example. Therefore, the same advantage is achieved even in a case of constituting, for example, the backup circuit alone. In such a constitution, the DC-to-DC converter 10, the condenser 11, the mechanical acceleration switch 12, the first-stage and second-stage driving transistors 16 to 23, etc. are disposed separately from the air bag starter, and subsequently, the backup circuit is connected to a separately disposed air bag starter.

In the case of a two-stage ignition type air bag system, it is possible to use in common the second-stage igniting means and the forced igniting means connected in parallel to the mechanical acceleration switch, such that a more economical air bag system is obtained.

What is claimed is:

1. An air bag starter comprising:
a mechanical acceleration switch that opens and closes in response to an acceleration of said vehicle, the mechanical acceleration switch connected to first and second switching means respectively connected to first and second igniters of a vehicle air bag system;
closure detecting means for detecting said mechanical acceleration switch being closed, and for outputting a signal A;
ignition judging means in communication with a detector for detecting the acceleration of the vehicle, said ignition judging means for judging a level of the detected acceleration, for deciding a method of igniting said first and second igniters, and for turning on said first switching means and simultaneously outputting a first signal;
logic means for outputting a forced ignition signal to forcedly ignite said first igniter on the basis of a logical AND value of said first signal and said signal A; and
a driving switch connected in parallel to said mechanical acceleration switch and controlled by said forced ignition signal, wherein closing of said driving switch backs up the closing of said mechanical acceleration switch.

2. The air bag starter according to claim 1, wherein the logic means outputs the forced ignition signal when the mechanical acceleration switch is closed.

3. The air bag starter according to claim 1, wherein the first igniter is one of a first-stage igniter of a two-stage airbag or an igniter of a one-stage airbag.

4. The air bag starter according to claim 1, wherein:
the first igniter comprises a first-stage igniter of a two-stage airbag;
the second igniter comprises a second-stage igniter of the two-stage airbag; and
the first signal output from the ignition judging means is simultaneously output with an instruction to turn on the first switching means to thereby ignite the first igniter.

5. The air bag starter according to claim 1, wherein:
the first igniter comprises an igniter of a one-stage driver's seat airbag;
the second igniter comprises an igniter of an one-stage assistant driver's side airbag; and
the first signal output from the ignition judging means is simultaneously output with an instruction to turn on the first switching means to thereby ignite the first igniter.

6. An air bag starter comprising:
feeding means for applying an electric current to first-stage and second-stage igniters in order to ignite and inflate a two-stage air bag system installed in a vehicle with a time lag therebetween;
first-stage switching means connected in series to said first-stage igniter;
second-stage switching means connected in series to said second-stage igniter;
a mechanical acceleration switch connected in series to said feeding means and said first-stage switching means or to said feeding means and said second-stage switching means and that closes in response to an acceleration of said vehicle;
closure detecting means for detecting the closure of said mechanical acceleration switch and outputting a first signal;

ignition judging means for judging the acceleration of said vehicle, deciding a method of igniting said first-stage and second-stage igniters, controlling said first-stage switching means according to the decided igniting method and outputting a second signal, and controlling said second-stage switching means and outputting a third signal;
logic means for outputting a forced ignition signal to forcedly ignite at least one of said first-stage and second-stage igniters on the basis of a logical AND value of said second signal and said first signal or a logical AND value of said third signal and said first signal; and
forced igniting means connected in parallel to said mechanical acceleration switch and controlled by said forced ignition signal.

7. The air bag starter according to claim 6, wherein the logic means outputs the forced ignition signal when the mechanical acceleration switch is closed.

8. A backup circuit of an air bag starter comprising:
closure detecting means for detecting closure of a mechanical acceleration switch that opens and closes in response to an acceleration of said vehicle, said mechanical acceleration switch connected to first and second switching means respectively connected to first and second igniters of a vehicle air bag system and outputting a signal A;
ignition judging means in communication with a detector for detecting the acceleration of the vehicle, said ignition judging means for judging a level of the detected acceleration, for deciding a method of igniting said first and second igniters, and for turning on said first switching means and simultaneously outputting a second first signal;
logic means for outputting a forced ignition signal to forcedly ignite said first igniter on the basis of a logical AND value of said first signal and said signal A; and
a driving switch connected in parallel to said mechanical acceleration switch and controlled by said forced ignition signal, wherein closing of said driving switch backs up the closing of said mechanical acceleration switch.

9. The backup circuit according to claim 8, wherein the logic means outputs the forced ignition signal when the mechanical acceleration switch is closed.

10. The backup circuit according to claim 8, wherein the first igniter is one of a first-stage igniter of a two-stage airbag or an igniter of a one-stage airbag.

11. The backup circuit according to claim 8, wherein:
the first igniter comprises a first-stage igniter of a two-stage airbag;
the second igniter comprises a second-stage igniter of the two-stage airbag; and
the first signal output from the ignition judging means is simultaneously output with an instruction to turn on the first switching means to thereby ignite the first igniter.

12. The backup circuit according to claim 8, wherein:
the first igniter comprises an igniter of a one-stage driver's seat airbag;
the second igniter comprises an igniter of an one-stage assistant driver's side airbag; and
the first signal output from the ignition judging means is simultaneously output with an instruction to turn on the first switching means to thereby ignite the first igniter.

* * * * *